(12) United States Patent
Nakajima et al.

(10) Patent No.: US 7,133,753 B2
(45) Date of Patent: Nov. 7, 2006

(54) INFORMATION PROVIDING SYSTEM

(75) Inventors: Toshiharu Nakajima, Fujisawa (JP); Tooru Futami, Fujisawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 50 days.

(21) Appl. No.: 10/769,857

(22) Filed: Feb. 3, 2004

(65) Prior Publication Data
US 2004/0162671 A1  Aug. 19, 2004

(30) Foreign Application Priority Data
Feb. 13, 2003 (JP) .............................. 2003-034893

(51) Int. Cl.
H04M 3/42 (2006.01)
H04M 7/00 (2006.01)
G08G 1/123 (2006.01)
G01C 21/34 (2006.01)

(52) U.S. Cl. ........................ 701/1; 701/209; 340/995.1; 379/218.01; 379/218.02; 379/201.02; 379/221.14

(58) Field of Classification Search ........... 379/142.04, 379/142.05, 142.06, 221.1, 218.01, 218.02, 379/201.02, 221.14; 455/565, 3.06, 414.3
See application file for complete search history.

(56) References Cited

U.S. PATENT DOCUMENTS

| 5,941,930 | A * | 8/1999 | Morimoto et al. ........... 701/201 |
| 5,987,381 | A * | 11/1999 | Oshizawa .................... 701/209 |
| 6,107,944 | A * | 8/2000 | Behr et al. ............. 340/995.12 |
| 6,169,955 | B1 * | 1/2001 | Fultz ........................... 701/200 |
| 6,360,164 | B1 * | 3/2002 | Murayama ................... 701/200 |
| 6,567,745 | B1 * | 5/2003 | Fuchs et al. ................. 701/209 |
| 6,801,763 | B1 * | 10/2004 | Elsey et al. .............. 455/404.1 |
| 6,816,727 | B1 * | 11/2004 | Cox et al. ................. 455/414.1 |
| 2001/0041562 | A1 | 11/2001 | Elsey et al. |
| 2002/0040271 | A1 * | 4/2002 | Park et al. ................... 701/209 |
| 2002/0055906 | A1 * | 5/2002 | Katz et al. ..................... 705/39 |
| 2002/0165666 | A1 | 11/2002 | Fuchs et al. |
| 2005/0143064 | A1 * | 6/2005 | Pines et al. ................. 455/428 |

FOREIGN PATENT DOCUMENTS

JP        11-160077        6/1999

* cited by examiner

Primary Examiner—Thomas Black
Assistant Examiner—Christine M. Behncke
(74) Attorney, Agent, or Firm—McDermott Will & Emery LLP

(57) ABSTRACT

An information providing system for vehicles includes: a first information center; a second information center; and an on-vehicle apparatus. The first information center includes a voice line to be used by an operator, an information search device that executes a search for facility information from a telephone directory data recording device, and a data transmission device that transmits the facility information obtained through the search executed by the information search device. The second information center includes a position search device that executes a search for position data corresponding to the facility information transmitted from the first information center, from a position data recording device, and a data line. The on-vehicle apparatus includes a communication device that obtains the facility information provided as a voice message from the first information center via the voice line and obtains the position data from the second information center via the data line.

19 Claims, 8 Drawing Sheets

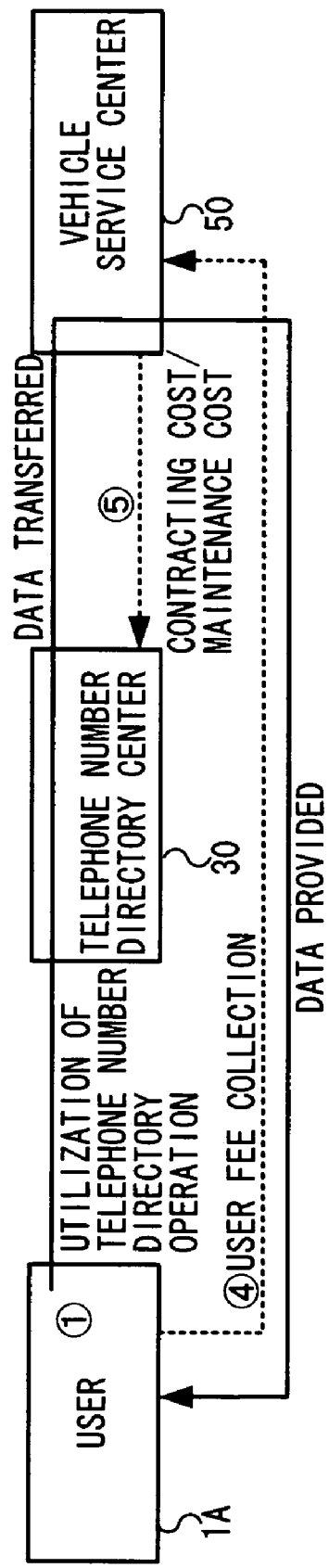

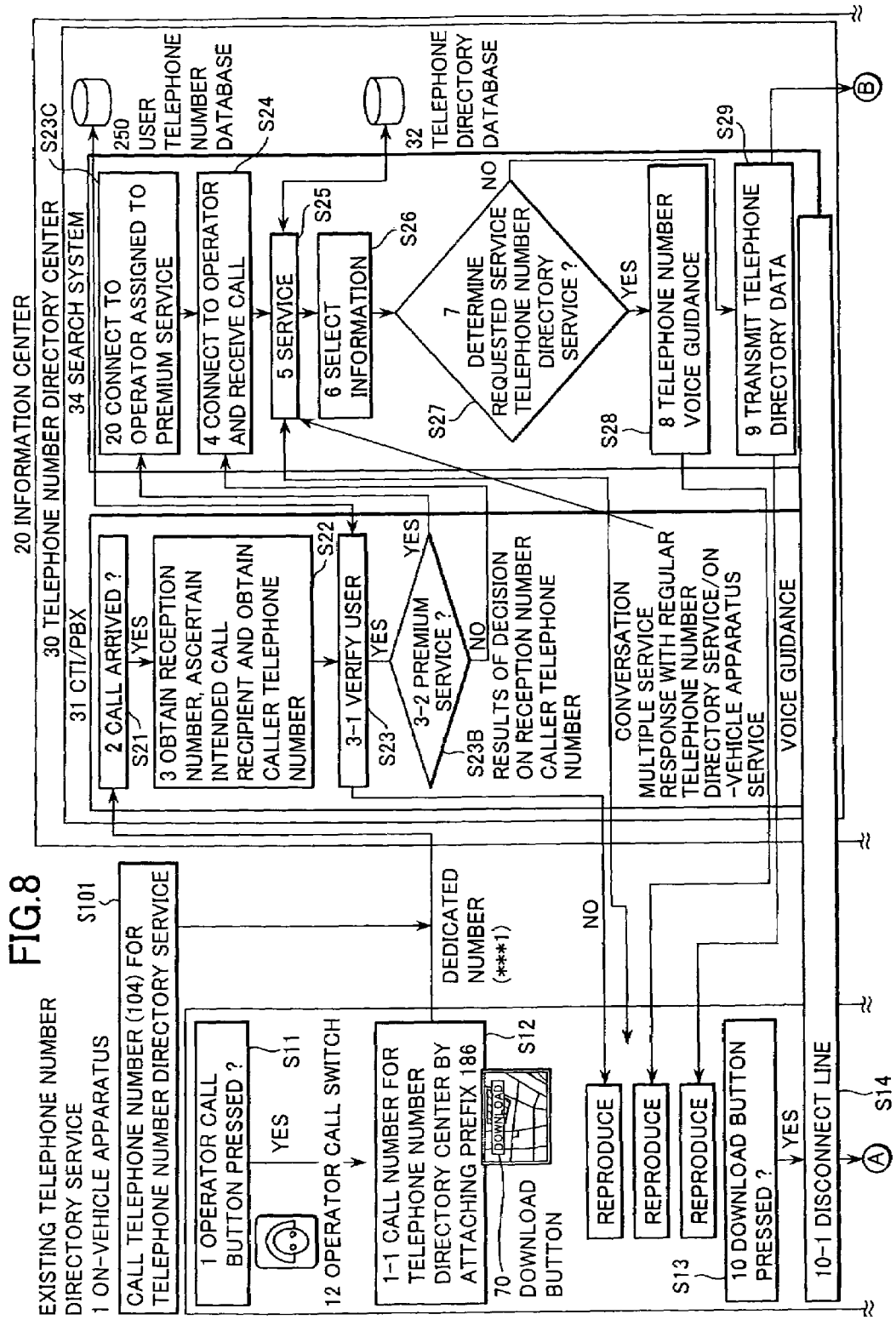

INFORMATION PROVIDING SYSTEM

BACKGROUND OF THE INVENTION

1. Field of the Invention

The present invention relates to an information providing system that provides information to a vehicle via a communication network

2. Description of the Related Art

There is an information providing system in the known art through which a mobile station such as a vehicle obtains useful information from an information center operating as an information provider by engaging in communication with the information center (see Japanese Laid Open Patent Publication No. H 11-160077). In the information providing system disclosed in Japanese Laid Open Patent Publication No. H 11-160077, an information acquisition apparatus installed in the vehicle obtains information provided by the information center via a portable telephone.

SUMMARY OF THE INVENTION

At the information center described above, an operator provides a service through voice conversation upon receiving a request through direct voice conversation with the vehicle side. Since operators must be hired specially to provide information services, the running costs of this information providing system will be high. If services are provided through an automatic response system without involving any operators, problems arise in that the available functions (such as the types of information that can be provided) become limited and that the operating procedure that needs to be performed on the vehicle side becomes more complicated.

The present invention provides an information providing system for vehicles that can be operated at lower running costs and only requires users to perform a simple operation to subscribe to services.

An information providing system for vehicles according to the present invention comprises: a first information center; a second information center; and an on-vehicle apparatus, and: the first information center comprises a voice line to be used by an operator, an information search device that executes a search for facility information from a telephone directory data recording device, and a data transmission device that transmits the facility information obtained through the search executed by the information search device; the second information center comprises a position search device that executes a search for position data corresponding to the facility information transmitted from the first information center, from a position data recording device, and a data line; and the on-vehicle apparatus comprises a communication device that obtains the facility information provided as a voice message from the first information center via the voice line and obtains the position data from the second information center via the data line.

An information providing center according to the present invention comprises: a call device that receives a call for a telephone number assigned to a telephone number directory service and a call for a telephone number assigned to an information providing service, and enables an operator to talk to a caller; an information search device that is operated by the operator who talks to the caller and searches predetermined information; an information generation device that generates providing information related to the predetermined information based upon at least a part of the predetermined information searched by the information search device; and a transmission device that transmits the providing information generated by the information generation device.

An on-vehicle apparatus according to the present invention comprises: a communication device that calls the above information providing center with the telephone number assigned to the information providing service, and receives the providing information provided from the information providing center; a navigation device that performs a predetermined navigation processing based upon the providing information received by the communication device.

An information providing method according to the present invention comprises: receiving either one of a call for a telephone number assigned to a telephone number directory service and a call for a telephone number assigned to an information providing service; talking to a caller; searching predetermined information based upon conditions determined through talking to the caller; generating providing information related to the predetermined information based upon at least a part of the searched predetermined information, when the call for the telephone number assigned to the information providing service has been received; and transmitting the generated providing information.

BRIEF DESCRIPTION OF THE DRAWINGS

FIG. 7 presents a flowchart of the fee collecting operation executed in an example of a variation; and FIG. 8 presents a flowchart of the information providing service operation for providing information to vehicles executed in the information providing system for vehicles achieved in a second embodiment.

DESCRIPTION OF THE PREFERRED EMBODIMENTS

The following is an explanation of the embodiments of the present invention, given in reference to the drawings.

(First Embodiment)

Figure 1:
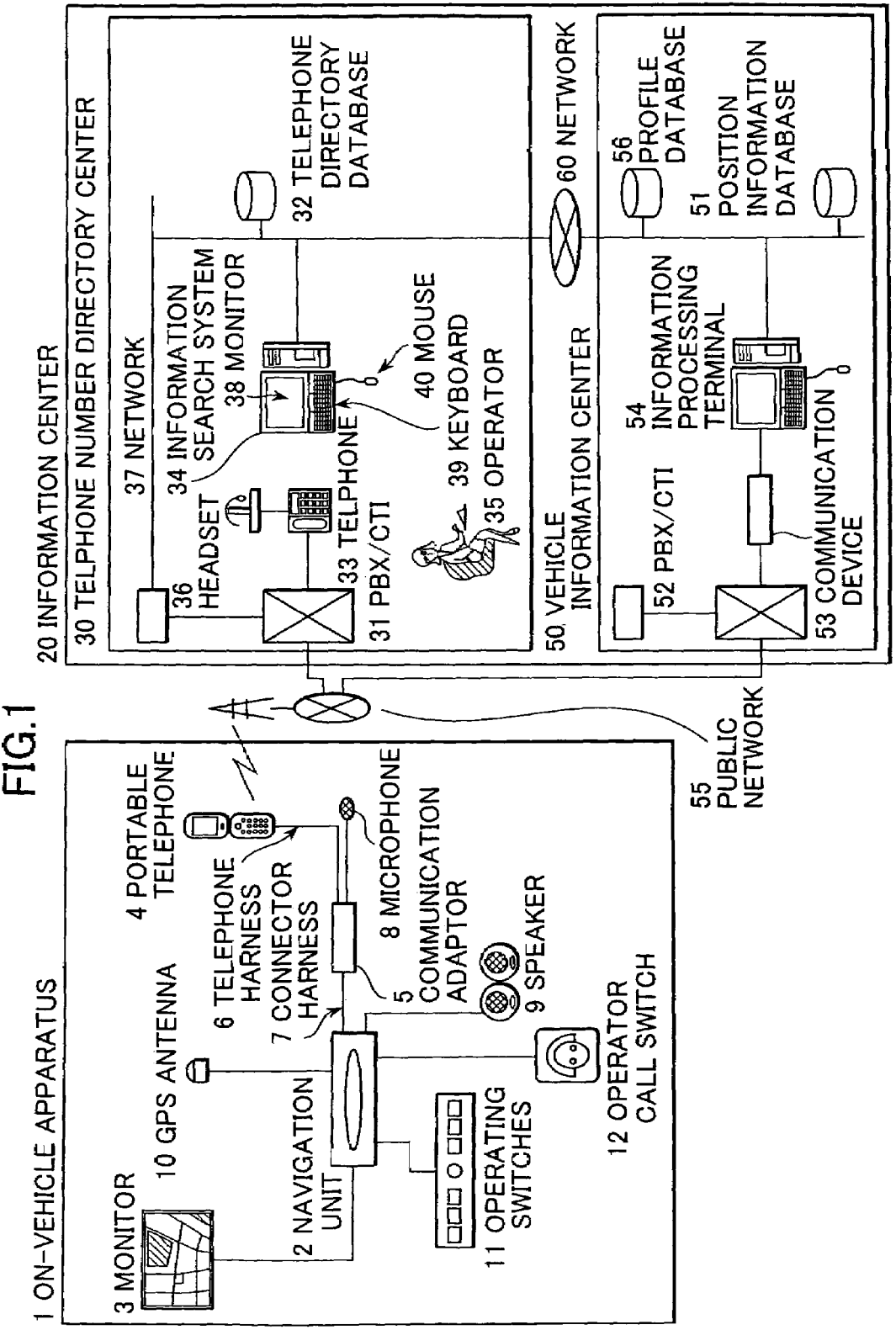
FIG. 1 schematically illustrates the overall structure of the information providing system for vehicles achieved in a first embodiment of the present invention.

FIG. 1 schematically illustrates the overall structure of the information providing system for vehicles achieved in the first embodiment of the present invention. The information providing system comprises an on-vehicle apparatus 1, which is installed in a vehicle such as an automobile, and an information center 20. The information center 20 is connected to a public network 55 and provides information to service subscribers (users) via the public network 55. The on-vehicle apparatus 1 accesses the public network 55 via a wireless telephone to enable the user to subscribe to an information providing service offered by the information center 20 via the on-vehicle apparatus 1.

The information center 20 comprises a telephone number directory center 30 and a vehicle information center 50. The telephone number directory center 30 and the vehicle information center 50 are connected with each other via a network 60. A service subscriber accesses the information center 20 from a fixed telephone such as a public telephone or a subscriber telephone or from a mobile telephone such as a portable telephone via the public network 55 (a wireless telephone network). Telephone numbers different from each other are assigned to the telephone number directory center 30 and the vehicle information center 50.

At the telephone number directory center 30, a telephone number and facility information corresponding to the telephone number are searched in response to a request issued by a service subscriber. The facility information may indicate, for instance, the name of a building, a store or the like, the address and the category of the facility. The telephone number directory center 30 provides the results of the telephone number search to the service subscriber who wishes to use the telephone number directory inquiries service only via the public network 55 (a wireless telephone network). If, on the other hand, the service subscriber also wishes to use the vehicle information providing service, the telephone number directory center 30 transmits the results of the facility information search to the vehicle information center 50 via the network 60.

The vehicle information center 50 temporarily stores the search results transmitted from the telephone number directory center 30 into a database which is to be detailed later in a specific format. The vehicle information center 50 reads out the stored search results from the database in response to a request from the service subscriber and provides the search results thus read out to the service subscriber via the public network 55 (a wireless telephone network). In addition, the vehicle information center 50 generates position information (e.g., longitude/latitude data) by using the facility information and provides the position information thus generated together with the facility information to the service subscriber.

The present invention is characterized in that the telephone number directory center 30 and the vehicle information center 50 in the information providing system for vehicles described above are set up so as to provide both the telephone number directory service and the vehicle information providing service via a single operator. The information provided to the vehicle through the information providing service may be, for instance, information with regard to a destination to which the vehicle is traveling.

In the information providing system for vehicles described above, a service subscriber wishing to use the telephone number directory service alone calls the telephone number assigned to the telephone number directory service. A service subscriber wishing to use the vehicle information providing service to obtain information on a destination or the like calls the telephone number assigned to the vehicle information providing service via a navigation unit 2. Either call is connected to the telephone number directory center 30 and the service subscriber engages in a conversation with an operator 35. Then, a telephone number, facility information and the like are searched in conformance to the conditions set based on the contents of the conversation.

The on-vehicle apparatus 1 includes the navigation unit 2, a monitor 3, a portable telephone (cellular phone) 4, a communication adapter 5, a microphone 8, a speaker 9, a GPS antenna 10, operating switches 11 and an operator call switch 12. The navigation unit 2 and the communication adapter 5 are connected with each other through a connector harness or cable 7, whereas the communication adapter 5 and the portable telephone 4 are connected with each other via a telephone harness or cable 6.

The navigation unit 2 detects the current position of the vehicle based upon position information obtained through the GPS antenna 10, executes route search for a route to be taken to reach a destination having been set and provides route guidance. The navigation unit 2 comprises a control device (not shown) that includes a microprocessor and peripheral circuits inside, and executes a predetermined program to perform navigation processing. At the monitor 3, map information, the results of the search and guidance information obtained at the navigation unit 2 and other types of information are displayed. The communication adapter 5, through which voice information entered via the microphone 8 is transmitted to the portable telephone 4 and voice information entered via the portable telephone 4 is transmitted to the navigation unit 2, enables a hands-free conversation on the portable telephone 4. The communication adapter 5 is also used to exchange data between the portable telephone 4 and the navigation unit 2. The speaker 9 is utilized to reproduce audio information output from the navigation unit 2 during the hands-free conversation or the like.

The operating switches 11 are operating switches operated to issue instructions for the navigation unit 2, to conduct a hands-free conversation and to execute data communication. As an operating switch 11 is operated, an operation signal corresponding to the operational details is sent out to the navigation unit 2. The operator call switch 12 is an operating switch that is operated to call up an operator at the information center 20. As the operator call switch 12 is operated, an operation signal is sent out to the navigation unit 2.

The telephone number directory center 30 comprises a PBX/CTI 31, a telephone 33, a headset 36, an information search system 34 and a telephone directory database 32. The telephone 33 is connected to the PBX/CTI 31 and the headset 36 is connected to the telephone 33. The telephone 33 and the headset 36 are used by the operator 35. A plurality of sets each constituted of a telephone 33 and a headset 36 are provided in correspondence to the number of operators 35 manning the information center. Each operator 35 engages in a telephone conversation with a service subscriber via the public network 55 (a wireless telephone network). The PBX/CTI 31, the information search system 34 and the telephone directory database 32 are individually connected to a network 37. The network 37 is connected with the network 60 as well.

The PBX/CTI 31 connects a call coming in through the public network 55 to the telephone 33 manned by an operator 35. The PBX/CTI 31 reproduces hold guidance information if all the operators 35 are currently busy serving other subscribers on their telephones 33. The hold guidance information may be, for instance, message information with a message such as "Please hold. The next available operator will be with you shortly." The information search system 34 is operated by an operator 35. As the operator 35 operates a keyboard 39 and a mouse 40, the information search system 34 executes a search of the telephone directory database 32 and displays the information hits at the monitor 38 by reading the information from the telephone directory database 32. It is to be noted that the telephone directory database 32 is updated as necessary as telephone service subscribers registered in the directory relocate. The telephone directory database 32 maybe updated on a regular basis instead. The database 32 is updated by the manager of the information center 20.

The vehicle information center 50 comprises a PBX/CTI 52, a communication device 53, an information processing terminal 54, a profile database 56 and a position information database 51. The information processing terminal 54, the profile database 56 and the position information database 51 are individually connected with the network 60.

The PBX/CTI 52 connects a call coming in through the public network 55 to the communication device 53. The communication device 53 engages in data communication with the on-vehicle apparatus 1 of a service subscriber via the public network 55 (a wireless telephone network). The information processing terminal 54 processes the data to be used in the data communication by the communication device 53. The profile database 56 stores therein search information provided by the telephone number directory center 30 via the network 60 in a specific format. The information stored in the profile database 56 is read out in response to a request from a service subscriber and is then downloaded to the on-vehicle apparatus 1 of the service subscriber.

The position information database 51 holds data achieved by attaching corresponding position information to address (location) data. The address data may indicate, for instance, "1-1-1 Nihonbashi, Chuo-ku, Tokyo" and the corresponding position information may be longitude/latitude data or data generated in a special format. The address data are updated whenever necessary as the street name or the like changes. It is to be noted that the manager of the information center 20 is responsible for the maintenance of the database 51.

Figure 2:
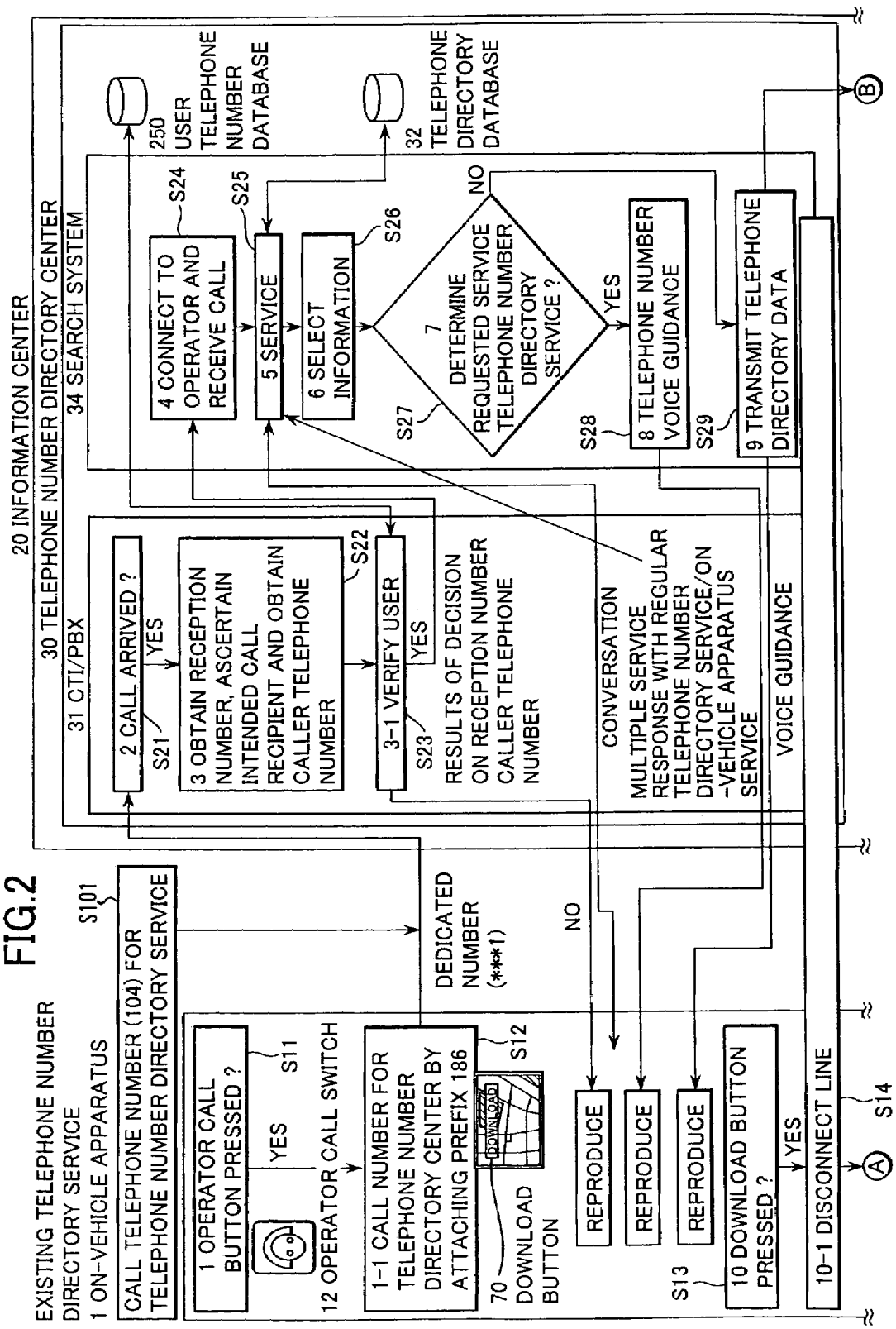
FIG. 2 presents a flowchart of the information providing service operation for providing information to vehicles executed in the information providing system for vehicles.
Figure 3:
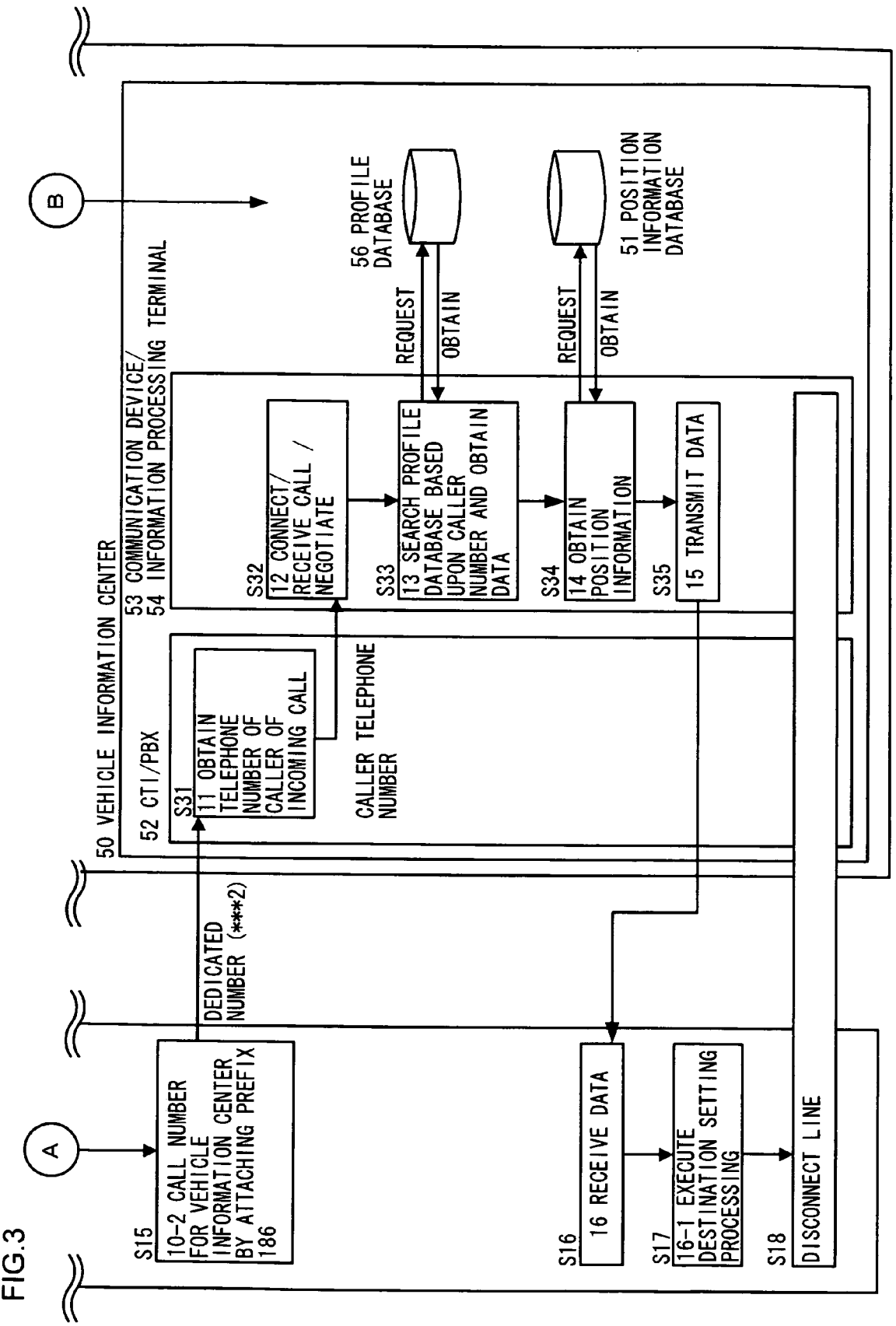
FIG. 3 presents a flowchart of the information providing service operation for providing information to vehicles executed in the information providing system for vehicles.

Next, the flow of the information providing service operation for providing information to vehicles executed in the information providing system for vehicles described above is explained in reference to the flowchart presented in FIGS. 2 and 3. The processing at the on-vehicle apparatus 1 is executed by the navigation unit 2. At the information center 20, the processing at the telephone number directory center 30 is executed by the PBX/CTI 31 and the information search system 34 and the processing at the vehicle information center 50 is executed by the PBX/CTI 52, the communication device 53 and the information processing terminal 54.

In step S11 in FIG. 2, the navigation unit 2 of the on-vehicle apparatus 1 makes a decision as to whether or not the operator call switch 12 has been pressed down. The navigation unit 2 makes an affirmative decision in step S11 if an operation signal has been input from the operator call switch 12 to proceed to step S12, whereas it makes a negative decision in step S11 if no operation signal has been input from the operator call switch 12 to repeatedly execute the decision-making processing.

In step S12, the navigation unit 2 reads out data indicating the telephone number of the telephone number directory center 30 which is pre-registered in the navigation unit 2 and issues a command for the communication adapter 5 to dial this telephone number. The telephone number is indicated as a "dedicated number *1" in FIG. 2. In response, the communication adapter 5 engages the portable telephone 4 in a calling operation. It is to be noted that the navigation unit 2 instructs the communication adapter 5 to dial a number (e.g. 186) used to notify the telephone number directory center 30 of the telephone number of the caller, i.e. the telephone number of the portable telephone 4, as a prefix to the telephone number of the telephone number directory center 30**.

A plurality of lines are installed at the telephone number directory center 30 and different telephone numbers are assigned to the telephone number directory service and the vehicle information providing service. A caller dialing either telephone number is connected to the telephone number directory center 30. The dedicated number *1 registered in the navigation unit 2** is the telephone number assigned to the vehicle information providing service.

After the calling operation is executed, the navigation unit 2 displays a download button 70 in the display screen of the monitor 3 before proceeding to step S13. The download button is used to obtain information as detailed later.

In step S21, the PBX/CTI 31 at the telephone number directory center 30 makes a decision as to whether or not an incoming call has arrived. The PBX/CTI 31 makes an affirmative decision in step S21 if an incoming call has arrived and the operation proceeds to step S22, whereas it makes a negative decision in step S21 if there has been no incoming call to repeatedly execute the decision-making processing described above.

In step S22, the PBX/CTI 31 obtains a reception (or arrival) number and makes a decision as to whether the caller of the incoming call has dialed the telephone number for the regular telephone number directory service or the telephone number for the information providing service (a destination setting service in this example) based upon the destination number. The reception number means a number that has been dialed to call by the caller and is received by a telephone or facility which the caller has called. The reception number corresponds to the telephone number dialed by the caller, i. e., different numbers are assigned to the telephone number directory service and the vehicle information providing service. The PBX/CTI 31 also obtains the telephone number of the portable telephone 4 of the caller (call originator) before the operation proceeds to step S23.

In step S23, the PBX/CTI 31 authenticates or verifies the user. More specifically, the PBX/CTI 31 makes a decision as to whether or not the caller telephone number is registered in a user telephone number database 250. The user telephone number database 250 is provided in a members-only information providing system that limits its services to members only. In such a system, the telephone number of the portable telephone 4 of each registered member (service subscriber) is registered in advance in the user telephone number database 250 by the manager of the information providing system. If the caller telephone number is registered in the user telephone number database 250, the PBX/CTI 31 recognizes the incoming call as a call placed by a member.

The PBX/CTI 31 makes an affirmative decision in step S23 if the caller telephone number is registered in the user telephone number database 250 and also transmits information indicating the results of the decision made on the reception number as described above and information indicating the caller telephone number to the information search system 34 operated by an operator 35 via the network 37. In addition, the PBX/CTI 31 directs the call to the telephone 33 of the operator 35 before the operation proceeds to step S24.

The PBX/CTI 31 makes a negative decision in step S23 if the caller telephone number is not registered in the user telephone number database 250, transmits guidance information such as "Member registration is required to subscribe to the service" and disconnects the line before the operation returns to step S21. If guidance information such as that described above is transmitted, the navigation unit 2 at the on-vehicle apparatus 1 reproduces the guidance information through the speaker 9.

In step S24, the information search system 34 displays the response-aiding information for the operator 35 transmitted from the PBX/CTI 31, i.e., the information indicating the results of the decision made on the reception number and the information indicating the caller telephone number at the monitor 38 (see FIG. 1). Then, the operator 35 talks to (has a conversation with) the service subscriber operating the on-vehicle apparatus 1 via the telephone 33. As the call is connected to the operator 35 and the operator 35 starts to talk to the service subscriber, the information search system 34 proceeds to step S25.

Figure 4:
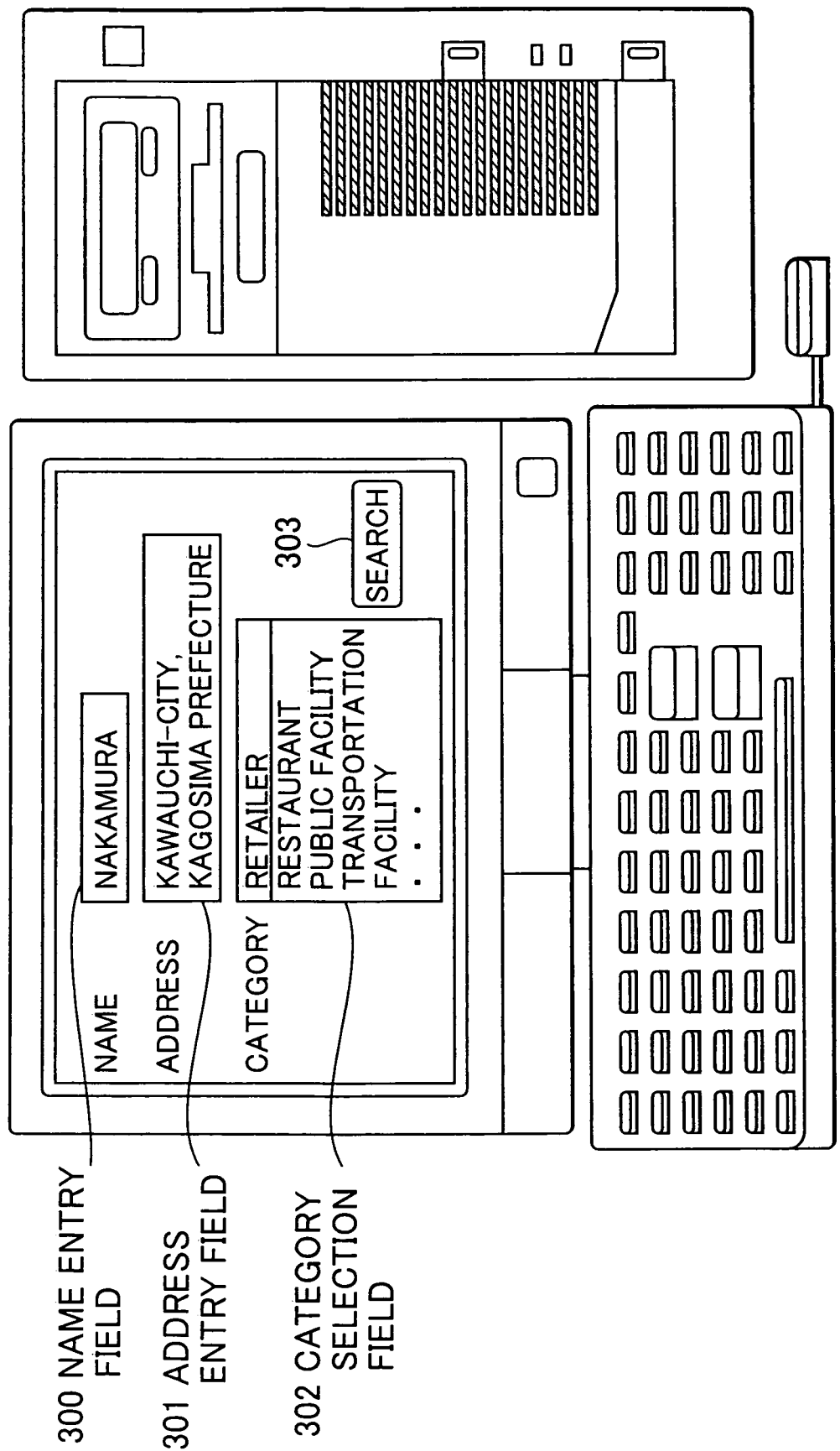
FIG. 4 presents an example of monitor display.

In step S25, the information search system 34 starts a service as necessary information for executing a search is entered by the operator 35. FIG. 4 presents an example of a display that may be brought up on the monitor 38 (see FIG. 1). In the example presented in FIG. 4, a name entry field 300, an address (location information) entry field 301, a category selection field 302 and a search button 303 are displayed. The operator 35 (see FIG. 1) obtains name information, address information and category information through the conversation with the service subscriber. The category information indicates a specific type of establishment in which the caller is interested, such as a retailer or a restaurant. The category information may indicate a public facility, a transportation facility or the like as well as a retailer or a restaurant.

As the operator 35 enters the information obtained from the service subscriber by operating the keyboard 39 and the mouse 40, search conditions are set for the information search system 34. As the operator 35 clicks the search button 303, the information search system 34 accesses the telephone directory database 32 to search for information matching the search conditions and then the operation proceeds to step S26. This processing in step S25 is commonly executed both when providing the telephone number directory service and when providing the information providing service (the destination setting service in this example).

Figure 5:
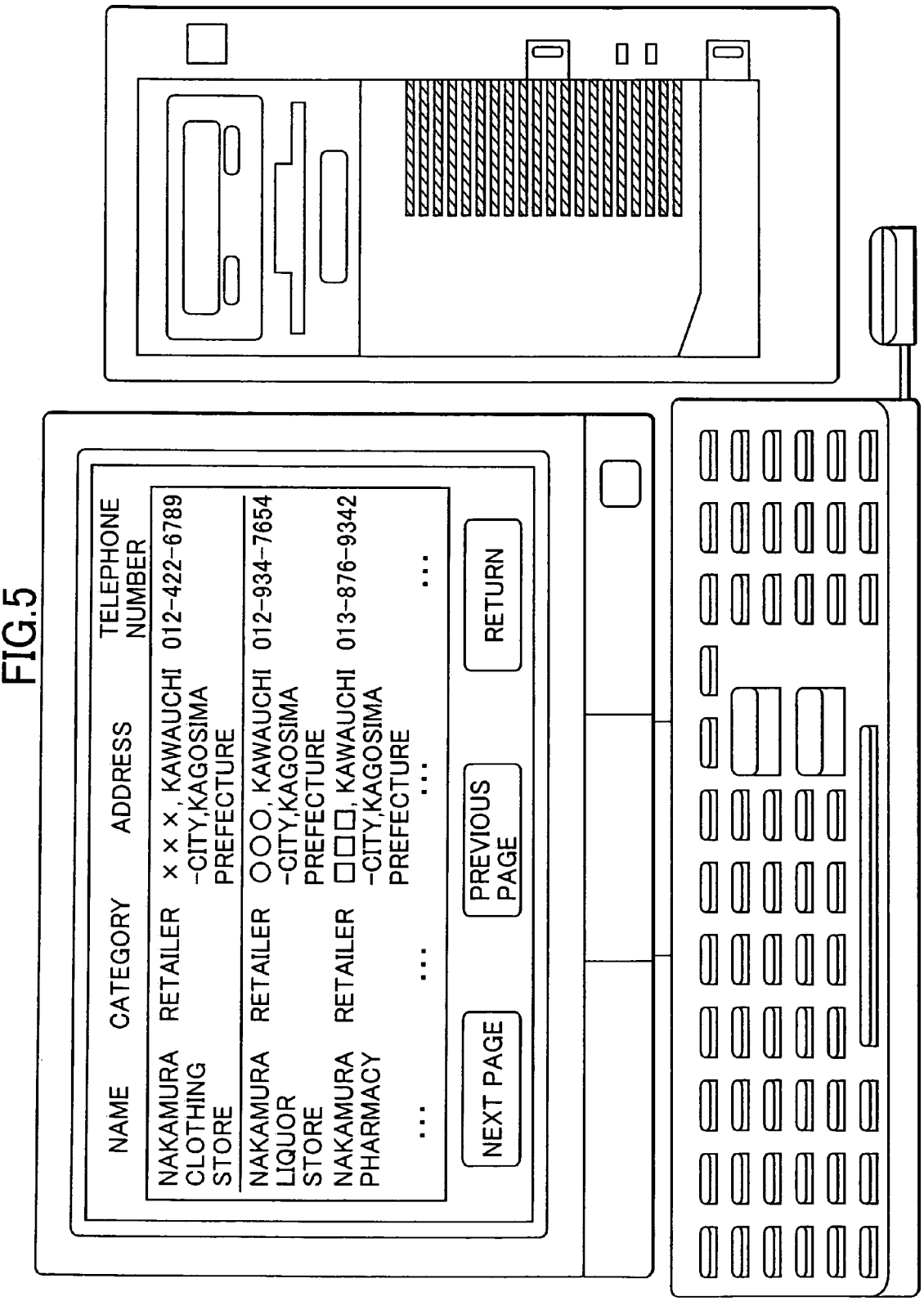
FIG. 5 presents an example of monitor display.

In step S26, the information search system 34 executes information selection processing. The information search system 34 reads out the information that has been hit through the search from the telephone directory database 32 and displays the information thus read out at the monitor 38, as shown in FIG. 5. Names, the category, addresses and telephone numbers are displayed in the screen shown in FIG. 5. They are extracted from facility information registered in the telephone directory database 32. If the service subscriber requests information on a clothing store during the telephone conversation, the operator 35 performs a selection operation to select the information needed by the service subscriber from the information displayed at the monitor 38. Once a selection operation signal is input to through the keyboard 39 or the mouse 40, the information search system 34 proceeds to step S27.

In step S27, the information search system 34 makes a decision with regard to the details of the requested service based upon the results of the decision made on the reception number provided by the PBX/CTI 31. The information search system 34 makes an affirmative decision in step S27 if the reception number indicates the telephone number directory service to proceed to step S28, whereas it makes a negative decision in step S27 if the reception number indicates the information providing service (the destination setting service in this example) to proceed to step S29. It is to be noted that the case in which the reception number indicates the telephone number directory service to proceed to step S28 corresponds to the case in which the service subscriber has called with the telephone number (for example 104) assigned to the telephone number directory service. For example, it is shown in step S101 in FIG. 2. In case that the operator call switch 12 has been pressed down, the on-vehicle apparatus 1 always calls with the telephone number assigned to the vehicle information providing service in step 12 and the operation always proceeds to step 29 in step 27.

In step S28, the information search system 34 issues an instruction for the operator 35 to read aloud the telephone number displayed at the monitor 38. The instruction for the operator 35 may be brought up on display at the screen of the monitor 38, for instance. As the operator 35 reads aloud the telephone number by following the instruction on display at the screen, voice guidance indicating the telephone number is sent to the portable telephone 4 at the on-vehicle apparatus 1 via the telephone 33, the PBX/CTI 31 and the public network 55 (a wireless telephone network). The navigation unit 2 then reproduces the voice guidance through the speaker 9 to provide the service subscriber with the telephone number. It is to be noted that after dispatching the voice guidance, the PBX/CTI 31 sustains a connected state until the line is disconnected by the on-vehicle apparatus 1.

In step S29, the information search system 34 transmits information indicating the address, the name and the telephone number on display at the monitor 38 and the information indicating the caller telephone number provided by the PBX/CTI 31 to the vehicle information center 50. In more specific terms, the information search system 34 accesses the profile database 56 via the network 60, and stores and registers the information obtained through the search as described above in the profile database 56, in correspondence to the caller telephone number.

In addition, the information search system 34 sends voice guidance such as "Press the download button" to the portable telephone 4 at the on-vehicle apparatus 1 via the PBX/CTI 31 and the public network 55 (a wireless telephone network). The voice guidance dispatched at this time is prepared in advance in the information search system 34. The navigation unit 2 reproduces the voice guidance through the speaker 9 to communicate the message to the service subscriber. The PBX/CTI 31 sustains the connected state after the voice guidance is dispatched until the line is disconnected by the on-vehicle apparatus 1.

In step S13, the navigation unit 2 at the on-vehicle apparatus 1 makes a decision as to whether or not an operating switch 11 corresponding to the download button 70 (see FIG. 2) has been pressed down. The navigation unit 2 makes an affirmative decision in step S13 if an operation signal indicating a download has been input through the operating switch 11 to proceed to step S14, whereas it makes a negative decision in step S13 if no such operation signal has been input through the operating switch 11 to repeatedly execute the decision-making processing. The download instruction is issued by the service subscriber upon hearing the voice guidance dispatched from the telephone number directory center 30.

In step S14, the navigation unit 2 transmits a line disconnect instruction to the communication adapter 5. In response, the communication adapter 5 engages the portable telephone 4 in communication (conversation in this example) end operation before the operation proceeds to step S15 in FIG. 3.

In step S15 in FIG. 3, the navigation unit 2 reads out data indicating the telephone number of the vehicle information center 50 pre-registered in the navigation unit 2 and issues a command for the communication adapter 5 to dial this telephone number. The telephone number is indicated as a "dedicated number * 2" in FIG. 3. The dedicated number * 2 is a telephone number exclusively used for downloads.

In response, the communication adapter 5 engages the portable telephone 4 in a calling operation. In this case, too, the navigation unit 2 instructs the communication adapter 5 to dial a number (e.g. 186) used to notify the vehicle information center 50 of the telephone number of the caller, i.e. the telephone number of the portable telephone 4, as a prefix to the telephone number of the vehicle information center 50. Once the calling operation is executed, the navigation unit 2 proceeds to step S16.

In step S31, the PBX/CTI 52 at the vehicle information center 50 obtains and ascertains the telephone number of the portable telephone 4 of the caller (call originator) if an incoming call has arrived, transmits information indicating the telephone number thus ascertained to the communication device 53/information processing terminal 54 and directs the call to the communication device 53 before the operation proceeds to step S32. The call made to the dedicated number \*\*\* 2, which is used exclusively for downloads, is connected to the vehicle information center 50 unlike phone calls made to the telephone number for the telephone number directory service and to the telephone number for the information providing service. It is to be noted that a user authentication or verification may be executed in a manner similar to that with which the user authentication or verification is executed at the telephone number directory center 30, when providing members-only services.

In step S32, the communication device 53/information processing terminal 54 are engaged in a negotiation to receive the call and to establish a data line before the operation proceeds to step S33. In step S33, the communication device 53/information processing terminal 54 reference the profile database 56 and obtain the information (the information indicating the address, the name and the telephone number in this example) registered in correspondence to the caller telephone number, which has been provided by the PBX/CTI 52, before the operation proceeds to step S34.

In step S34, the communication device 53/information processing terminal 54 issues a request to the position information database 51 for position information (position data) matching the information indicating the address, and once the position data are obtained, the operation proceeds to stepped S35. If corresponding position data cannot be obtained, the communication device 53/information processing terminal 54 generates information indicating that the position information is not available before the operation proceeds to step S35. It is to be noted that the operation may proceed to step S35 after obtaining position data matching a neighboring address if the corresponding position data are not available.

In step S35, the communication device 53/information processing terminal 54 transmits the information indicating the address, the name and the telephone number obtained from the profile database 56 and the position data obtained from the position information database 51 via the communication device 53. If no position data have been obtained from the position information database 51, the information indicating that the position information is not available is transmitted instead of the position information. In addition, if the position data being transmitted is position data corresponding to a neighboring address, information indicating that the position data correspond to a neighboring address is attached to the data being transmitted. The PBX/CTI 52 sustains the connected state after the data are transmitted until the line is disconnected by the on-vehicle apparatus 1.

In step S16, the navigation unit 2 at the on-vehicle apparatus 1 receives the data via the portable telephone 4 and the communication adapter 5 before the operation proceeds to step S17. In step S17, the navigation unit 2 sets the position data having been received as a destination, and then the operation proceeds to step S18. Thus, it becomes possible to ascertain a traveling route from the current position to the destination through search processing of the known art. If the information indicating that the position information is not available, the navigation unit 2 brings up a message indicating that no position information has been obtained at the monitor 3. In addition, if the information indicating that the position information corresponds to a neighboring address is attached, the navigation unit 2 brings up a message indicating that the position information is neighboring address position data at the monitor 3.

In step S18, the navigation unit 2 sends a line disconnect instruction to the communication adapter 5 and ends the processing shown in FIG. 3. In response, the communication adapter 5 engages the portable telephone 4 in a communication end operation to disconnect the line.

Figure 6:
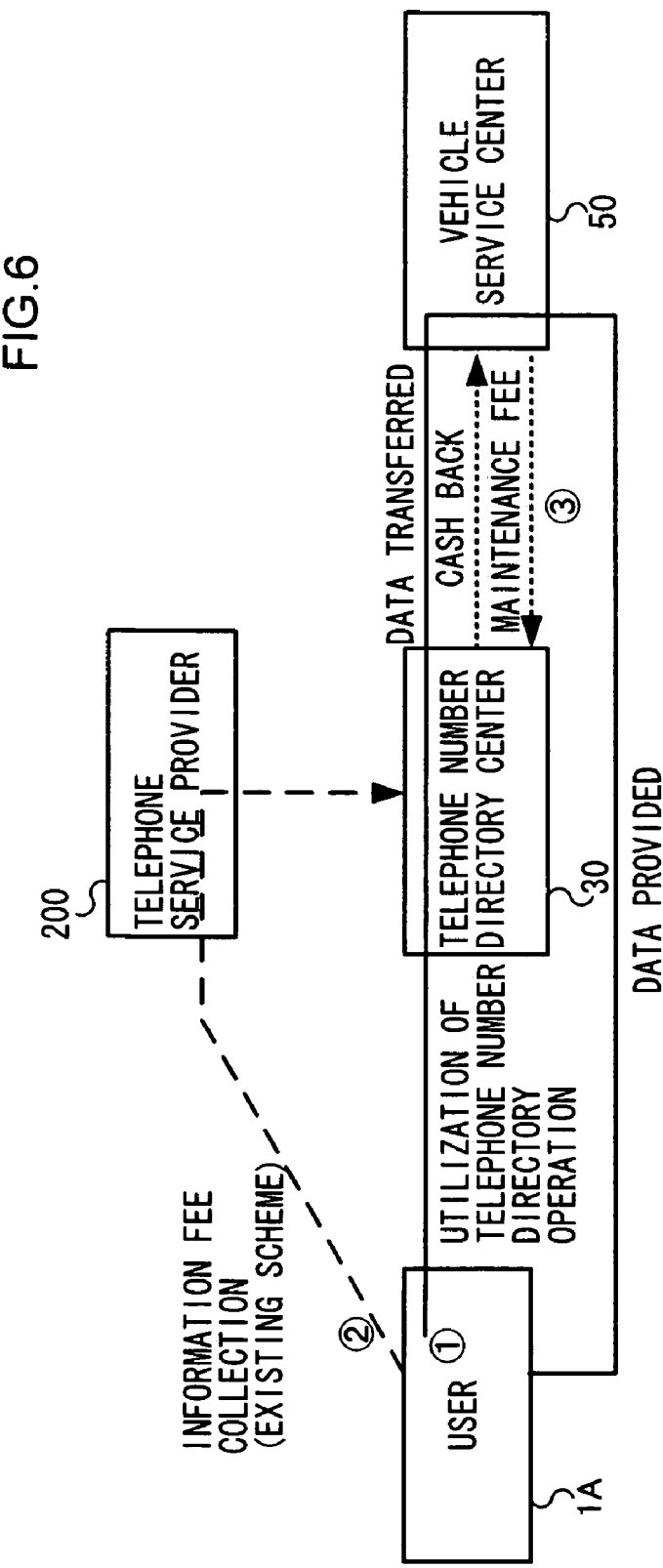
FIG. 6 presents a flowchart of the fee collecting operation executed in the information providing system.

FIG. 6 presents a flowchart of the billing or charging operation, i.e., the fee collecting operation, executed in the information providing system described above. In the flow shown in FIG. 6, the user (service subscriber) uses the information providing service described above as indicated by an arrow 1. Namely, the user uses the telephone number directory service provided by the telephone number directory center 30 and also receives data provided by the vehicle service center (the vehicle information center) 50 which receives the data obtained through the telephone number search.

As indicated by an arrow 2, the information fee is collected from the user by a communication business operator (a telephone service provider in the example described above) 200. This fee includes the information fee alone, or it may include the information fee and the call charge (line use fee). The communication business operator 200 pays the collected fee to the telephone number directory center 30. Alternatively, the communication business operator 200 may pay the sum of money calculated by subtracting a commission from the collected fee to the telephone number directory center 30. The telephone number directory center 30, in turn, pays a portion of the fee obtained from the communication business operator 200 as a cash back to the vehicle information center 50. The values of the telephone number directory service and the data providing service are not necessarily set equal to each other and they may be set freely. As indicated by an arrow 3, the vehicle service center 50 pays a portion of the payment it has received to the telephone number directory center 30 as an operation maintenance fee.

The following advantages are achieved in the first embodiment described above.

(1) At the information center 20 comprising the telephone number directory center 30 and the vehicle information center 50, both the telephone number directory service and the vehicle destination information providing service for the navigation unit 2 can be provided through a single operator 35. As a result, the running costs can be reduced compared to those necessitated when separate operators 35 are hired to man the telephone number directory center 30 and the vehicle information center 50. In addition, while the existing telephone companies are only capable of providing the telephone number directory service, the vehicle information providing service can be provided through a similar procedure together with the telephone number directory service by adopting this information providing system.

(2) The operator 35 manning the telephone number directory center 30 performs an operation to search the telephone directory database 32 to provide both the telephone number directory service and the destination setting service (step S25). Thus, since the operator 35 does not need to perform different operations in correspondence to the individual services, the onus placed on the operator 35 is kept low. In addition, since the service subscriber can talk to the operator 35 to use either service, the contents of the services do not become limited or the procedure of the operation that needs to be performed by the service subscriber does not become complicated, unlike in an automatic response system that does not involve any operators. As a result, a user-friendly system is achieved. Furthermore, the telephone number directory center 30 according to the present invention can be achieved by directly utilizing the facilities at an existing telephone number directory service center.

(3) Only when the subscriber wishes to use the destination setting service, the information obtained through the search operation performed by the operator 35, i.e., the information indicating the address, the name and the telephone number, is automatically transferred from the information search system 34 at the telephone number directory center 30, to the profile database 56 at the vehicle information center 50. Since no information is provided to the vehicle information center 50 if the subscriber is using the telephone number directory service, an unnecessary data transfer is eliminated.

(4) The data transmitted to the vehicle information center 50 as described in (3) above are downloaded to the navigation unit 2 at the on-vehicle apparatus 1 via the line connection with the telephone number assigned to the vehicle information center 50 after disconnecting the line to the telephone number of the telephone number directory center 30 and, as a result, the line connection to the operator 35 is not occupied for an extended period of time. Thus, the availability of the phone line to the telephone number directory center 30 increases. In addition, since the data are downloaded to the navigation unit 2 automatically via the communication device 53, the operation that needs to be performed by the service subscriber can be minimized.

(5) The information fee is collected by the communication business operator 200 from the user, the collected fee is then paid by the communication business operator 200 to the telephone number directory center 30, and a portion of the fee is paid by the telephone number directory center 30 to the vehicle service center 50. Thus, the existing fee collection flow can be utilized as indicated by the arrow 2 in FIG. 6 without having to incur high costs, unlike in a situation in which a new fee collection system needs to be created.

If the information search system 34 described above is equipped with a receiver function, the operator 35 may receive an incoming call at the information search system 34. In such a case, a call arrival signal is transmitted from the PBX/CTI 31 to the information search system 34 via the network 37.

In step S27, the information search system 34 determines the contents of the requested service based upon the results of the decision made with regard to the reception number provided by the PBX/CTI 31. Instead, the contents of the service may be determined through a selection operation performed by the operator 35.

In step S28, the information search system 34 issues an instruction for the operator 35 to read aloud the telephone number. Instead, an audio signal may be automatically transmitted from the PBX/CTI 31. In such a case, the information indicating the telephone number is output from the information search system 34 to the PBX/CTI 31 via the network 37.

A touch panel switch may be provided at the display screen of the monitor 3. In such a case, as the service subscriber touches the download button 70, an operation signal is transmitted to the navigation unit 2.

The download button 70 does not need to be displayed at the monitor 3, and instead, a download switch may be provided as a separate switch in addition to the switches described earlier.

When the service subscriber operates the switch corresponding to the download button 70 (when an affirmative decision is made in step S13), the line between the on-vehicle apparatus 1 and the telephone number directory center 30 is disconnected by the on-vehicle apparatus 1 (step S14). Instead, the line may be disconnected by the telephone number directory center 30. In this case, the line between the on-vehicle apparatus 1 and the telephone number directory center 30 should be disconnected after the information search system 34 provides the telephone number voice guidance (step S28) or the speech message guidance (step S29).

When the services of the information providing system are offered to members only, the telephone number of the portable telephone 4 belonging to each registered member (service subscriber) is registered in the user telephone number database 250. Instead of telephone numbers, member IDs may be registered. In this case, after a call is made from a portable telephone 4 to establish a line connection with the telephone number directory center 30, the corresponding ID is transmitted from the on-vehicle apparatus 1 to the telephone number directory center 30. If the ID is registered in a user ID database (which is provided instead of the user telephone number database 250), the PBX/CTI 31 can verify that the incoming call is placed by a member. The ID-based user authentication or verification eliminates the need to attach the prefix number indicating the caller telephone number, i.e., the telephone number of the portable telephone 4, to the telephone number dialed to connect the telephone number directory center 30.

The communication business operator 200 may pay an additional sum of money on top of the fee that it has collected to the telephone number directory center 30. The communication business operator 200 can then set the fee to be charged to the user at a lower level by incurring part of the information fee. This will improve the user-friendliness to encourage more users to subscribe to the services offered by the information providing system for vehicles.

The billing operation may be executed as shown in the flowchart in FIG. 7 in the information providing system. In FIG. 7, the information fee (the user fee) is collected from the user by the vehicle service center 50, as indicated by an arrow 4. The vehicle service center 50 then pays a portion of the collected fee to the telephone number directory center 30 (an arrow 5). The sum paid to the telephone number directory center 30 is used to cover the operation maintenance costs and the contracting costs. This billing system is effective when adopted in conjunction with members-only services.

The telephone number directory center 30 and the vehicle information center 50 do not need to be located within a single facility.

As long as the telephone directory database 32 can be searched from the information search system 34 at the telephone number directory center 30, the telephone directory database 32 does not need to be located within the same facility as the telephone number directory center 30.

As long as the profile database 56 and the position information database 51 can be individually searched from the information processing terminal 54 at the vehicle information center 50, they do not need to be located within the same facility as the vehicle information center 50.

In the embodiment described above, the dedicated number * 1 registered in the navigation unit 2 is the telephone number for the vehicle information providing service. In addition to this telephone number, the telephone number for the telephone number directory service may be registered at the navigation unit 2. Namely, the telephone number directory service may be used via the navigation unit 2. It is to be noted that the telephone number for the telephone number directory service is equivalent to the telephone number for a number directory service provided by an existing telephone company. Thus, the telephone number directory service can be used on a fixed telephone or a regular portable telephone, independently from the navigation unit 2**.

(Second Embodiment)

In addition to the destination setting service that provides the user with the destination position information, traffic information or weather information may be provided. FIG. 8 presents a flowchart of the vehicle information providing service operation executed in the information providing system for vehicles in the second embodiment. The operation in the flowchart presented in FIG. 8 is executed in place of the operation executed in the first embodiment, as shown in the flowchart in FIG. 2. The operation differs from that shown in FIG. 2 in that it includes additional steps S23B and S23C, and the following explanation focuses on this difference.

In step S23 in FIG. 8, the PBX/CTI 31 authenticates or verifies the user. In this user authentication, a decision is made as to whether or not the caller is a premium service member allowed to use a service other than the destination setting service, which provides the user with traffic information or weather information (hereafter to be referred to as a premium service) is made. The PBX/CTI 31 makes a decision as to whether or not the caller telephone number having been ascertained is registered in the user telephone number database 250 as a number belonging to a premium service member. The telephone number of the portable telephone 4 belonging to each member (service subscriber) registered as a premium service member is registered in the user telephone number database 250 in advance by the manager of the information providing system. If the caller telephone number is registered as a number belonging to a premium service member in the user telephone number database 250, the PBX/CTI 31 recognizes the caller as a premium service member.

The PBX/CTI 31 makes an affirmative decision in step S23B if the caller telephone number belongs to a premium service member and directs the call to an operator booth (not shown) of an operator assigned to the premium service, before the operation proceeds to step S23C. At this time, the results of the decision made on the reception number and the information indicating the caller telephone number are also transmitted to the operator booth. In response, the operator assigned to the premium service provides the member with traffic information, weather information or the like through the premium service. The operator booth assigned to the premium service does not need to be located inside the telephone number directory center 30.

If, on the other hand, the caller telephone number does not indicate a premium service member, the PBX/CTI 31 makes a negative decision in step S23B and the operation proceeds to step S24. The processing executed subsequently in this case is identical to that executed in the first embodiment. The PBX/CTI 31 also makes a negative decision in step S23B if the caller telephone number is not registered in the user telephone number database 250. When this happens, the guidance information such as "Member registration is required to use this service" is reproduced and the line is disconnected before the operation returns to step S21.

The second embodiment explained above makes it possible to provide traffic information, weather information and the like in addition to the destination setting service without having to alter the structure of the on-vehicle apparatus 1 from that assumed in the first embodiment.

It is to be noted that voice line corresponds to, for instance, the PBX/CTI 31 and the telephone 33. The means for telephone directory data recording may be constituted with, for instance, the telephone directory database 32. The means for information search may be constituted with, for instance, the information search system 34. The means for data communication corresponds to the information search system 34 and the network 60. The first information center may be constituted with, for instance, the telephone number directory center 30. The means for position data recording may be constituted with the position information database 51. The means for position search may be constituted with the information processing terminal 54. The data line corresponds to the PBX/CTI 52 and the communication device 53. The second information center may be constituted with, for instance, the vehicle information center 50.

The means for communication may be constituted with the portable telephone 4, the communication adapter 5 and the navigation unit 2. The on-vehicle apparatus corresponds to the on-vehicle apparatus 1. Street number information corresponds to the address (location) data. The position data correspond to the longitude/latitude data. It is to be noted that the individual components may take on structures other than those described above as long as the functions characterizing the present invention remain intact.

The information providing system according to the above mentioned embodiments provides an information providing system for vehicles that can be operated at low running cost and only requires a service subscriber to perform a simple operation to use the services.

The above described embodiments are examples, and various modifications can be made without departing from the spirit and scope of the invention.

The disclosure of the following priority application is herein incorporated by reference:

Japanese Patent Application No. 2003-034893 filed Feb. 13, 2003

What is claimed is:

1. An information providing system for vehicles comprising:
   a first information center that operates with a human operator;
   a second information center that operates without a human operator and is connected to the first information center via a network; and
   an on-vehicle apparatus, wherein:
   the first information center comprises a voice line to be used by the operator, an information search device that executes a search for facility information from a telephone directory data recording device, and a data transmission device that transmits the facility information obtained through the search executed by the information search device via the network;

the second information center comprises a position search device that executes a search for position data corresponding to the facility information transmitted from the first information center via the network, from a position data recording device, and a data line to be used to transmit the position data out of the second information center to the on-vehicle apparatus; and the on-vehicle apparatus comprises a communication device that obtains the facility information provided as a voice message from the first information center via the voice line and obtains the position data, which is not a voice message, from the second information center via the data line;

the position search device does not execute the search for position data corresponding to the facility information transmitted from the first information center via the network when a received call is directed to a telephone number assigned to a telephone number directory service; and the position search device executes the search for position data corresponding to the facility information transmitted from the first information center via the network when a received call is directed to a telephone number assigned to an information providing service.

2. An information providing system for vehicles according to claim 1, wherein:

the telephone directory data recording device holds at least telephone number information and address information; and the information search device executes a search for at least the telephone number information from the telephone directory data recording device.

3. An information providing system for vehicles according to claim 1, wherein:

the position data recording device holds position data corresponding to at least each set of address information; and the position search device executes a search for position data corresponding to address information included in the facility information obtained through a search executed by the information search device, from the position data recording device.

4. An information providing system for vehicles according to claim 3, wherein:

the on-vehicle apparatus further comprises a navigation device that executes a search for a route to a destination; and the navigation device uses the position data obtained by the communication device as destination data.

5. An information providing system for vehicles according to claim 1, wherein:

the first information center is a telephone number directory center; and the second information center a vehicle information center.

6. An information providing system for vehicles according to claim 1, wherein:

the first information center further comprises a call device configured to receive a call to the telephone number assigned to the telephone number directory service and a call to the telephone number assigned to the information providing service, and to enable the operator to talk to each caller through the voice line; and the information search device is operated by the operator who talks to the caller to execute the search for facility information from the telephone directory data recording device.

7. An information providing center comprising:

a call device configured to receive a call to a telephone number assigned to a telephone number directory service and a call to a telephone number assigned to an information providing service, and to enable an operator to talk to each caller;

an information search device that is operated by the operator who talks to the caller and searches predetermined information;

an information generation device configured to generate information related to the predetermined information based upon a search result for the predetermined information performed by the information search device; and a transmission device configured to transmit the information generated by the information generation device;

wherein the information generation device does not generate the information related to the predetermined information when the call device has received the call to the telephone number assigned to the telephone number directory service, and generates the information related to the predetermined information when the call device has received the call to the telephone number assigned to the information providing service.

8. An information providing center according to claim 6, wherein:

the predetermined information includes telephone number information and address information.

9. An information providing center according to claim 8, wherein:

the information generation device generates position information based upon the address information.

10. An information providing center according to claim 9, wherein:

the information generation device comprises a position data recording device that stores position data corresponding to each address, and obtains position information corresponding to the address information from the position data recording device.

11. An information providing center according to claim 8, wherein:

the information generation device generates position information related to longitude and latitude based upon the address information.

12. An information providing center according to claim 7, wherein:

the transmission device receives a call to a telephone number which is assigned to a data transmission and is different from the telephone number assigned to the telephone number directory service and the telephone number assigned to the information providing service, and transmits the generated information in response to a reception of the call to the telephone number assigned to the data transmission, via a line through which the call to the telephone number assigned to the data transmission has been received.

13. An information providing center according to claim 7, wherein:

the information search device comprises a telephone number directory recording device that stores a name, a telephone number and an address corresponding to each of telephone service subscribers, and searches at least one of a name, a telephone number and an address corresponding to a telephone service subscriber, from the telephone number directory recording device based upon information input by an operation of the operator.

14. An information providing center according to claim 7, wherein:
the call device obtains first identification information that identifies the caller calling to the call device;
a recording device that stores the predetermined information searched by the information search device in correspondence to the first identification, is further provided;
the transmission device receives a call to a telephone number which is assigned to a data transmission and is different from the telephone number assigned to the telephone number directory service and the telephone number assigned to the information providing service, and obtains second identification information that identifies a caller calling to the transmission device;
the information generation device obtains the stored predetermined information in correspondence to the first identification information, corresponding to the second identification information, and generates the information related to the predetermined information based upon at least a part of the obtained predetermined information; and
the transmission device transmits the generated information via a line through which the call for the telephone number assigned to the data transmission has been received.

15. An on-vehicle apparatus comprising:
a communication device that calls an information providing center according to claim 7 with the telephone number assigned to the information providing service, and receives the generated information provided from the information providing center;
a navigation device that performs a predetermined navigation processing based upon the generated information received by the communication device.

16. An on-vehicle apparatus according to claim 15, further comprising:
an instruction device that instructs receiving of the generated information, wherein
when the instruction device has instructed receiving of the generated information, the communication device calls the information providing center with a telephone number which is assigned to a data transmission and is different from the telephone number assigned to the information providing service, and receives the generated information via a line through which the communication device has called the information providing center with the telephone number assigned to the data transmission.

17. An on-vehicle apparatus according to claim 16, wherein when the instruction device has instructed receiving of the generated information, the communication device disconnects a line through which the communication device called the information providing center with the telephone number assigned to the information providing service.

18. An information providing method comprising:
receiving a call to a telephone number assigned to a telephone number directory service or a call to a telephone number assigned to an information providing service;
talking to each caller;
searching predetermined information based upon conditions determined through a result of the step of talking to the caller;
generating information related to the predetermined information based upon a result of the searching step, when the call to the telephone number assigned to the information providing service has been received; and
transmitting the generated information;
wherein information related to the predetermined information is not generated based upon the result of the searching step when the call to the telephone number assigned to the telephone number directory service has been received.

19. An information providing center comprising:
a call means for receiving a call to a telephone number assigned to a telephone number directory service and a call to a telephone number assigned to an information providing service, and enabling an operator to talk to each caller;
an information search means, which is operated by the operator who talks to the caller, for searching predetermined information;
an information generation means for generating information related to the predetermined information based upon a search result of the predetermined information performed by the information search means; and
a transmission means for transmitting the information generated by the information generation means;
wherein the information generation means does not generate the information related to the predetermined information when the call means has received the call to the telephone number assigned to the telephone number directory service, and generates the information related to the predetermined information when the call means has received the call to the telephone number assigned to the information providing service.

* * * * *